United States Patent
Tsukagoshi et al.

(10) Patent No.: US 6,603,733 B2
(45) Date of Patent: Aug. 5, 2003

(54) OPTICAL INFORMATION MEDIUM

(75) Inventors: Takuya Tsukagoshi, Chuo-ku (JP); Jiro Yoshinari, Chuo-ku (JP)

(73) Assignee: TDK Corporation, Tokyo (JP)

( * ) Notice: Subject to any disclaimer, the term of this patent is extended or adjusted under 35 U.S.C. 154(b) by 214 days.

(21) Appl. No.: 09/917,617

(22) Filed: Jul. 31, 2001

(65) Prior Publication Data

US 2002/0018438 A1 Feb. 14, 2002

(30) Foreign Application Priority Data

Aug. 1, 2000 (JP) .................................... 2000-233785

(51) Int. Cl.[7] .............................................. G11B 5/84
(52) U.S. Cl. .................... 369/280; 369/286; 369/275.1; 428/64.4
(58) Field of Search ................. 369/280, 283, 369/286, 275.1, 275.2, 275.5, 272, 273, 274; 428/64.4, 64.1, 64.3, 64.2; 430/320, 321

(56) References Cited

U.S. PATENT DOCUMENTS

| | | | | |
|---|---|---|---|---|
| 5,675,570 A | * | 10/1997 | Ohira et al. | 369/275.1 |
| 5,936,934 A | * | 8/1999 | Kuribayashi et al. | 369/286 |
| 6,049,521 A | * | 4/2000 | Aratani | 369/280 |
| 6,154,442 A | * | 11/2000 | Kondo et al. | 369/286 |
| 6,333,914 B1 | * | 12/2001 | Ohki et al. | 369/286 |
| 6,353,592 B1 | * | 3/2002 | Kashiwagi et al. | 369/283 |
| 6,538,983 B1 | * | 3/2003 | Satoh | 369/286 |

FOREIGN PATENT DOCUMENTS

| | | | | |
|---|---|---|---|---|
| JP | 4-28035 | * | 1/1992 | 369/280 |
| JP | 4-38635 | * | 2/1992 | 369/280 |
| JP | 8-255374 | | 10/1996 | |
| JP | 9-198709 | | 7/1997 | |
| JP | 10-222856 | | 8/1998 | |

OTHER PUBLICATIONS

Takuo Tanaka et al. Three–Dimensional Multi–layered Optical Memory with Laser Scanning Microscope Technology Symposium on Optical Memory Jul. 11–13, 1994 pp. 19–20.

* cited by examiner

*Primary Examiner*—Tan Dinh
(74) *Attorney, Agent, or Firm*—Oblon, Spivak, McClelland, Maier & Neustadt, P.C.

(57) ABSTRACT

An optical information disk with an excellent mechanical precision is provided. Also provided is a multi-layer optical disk having a plurality of data layers wherein every data layer exhibits sufficient properties in reading. In addition, such multi-layer optical disk is provided at a low cost. The optical information comprises a disk-shaped substrate or a pair of disk-shaped substrates, and at least one annular data layer for storing at least recorded information and at least one annular resin layer disposed on said disk-shaped substrate or between said pair of disk-shaped substrates. In this medium, at least one of the substrate(s) has a configuration such that its surface facing toward the data layer is convex, and at least one of said resin layer(s) is formed such that it is thicker near its outer periphery compared to the region near its inner periphery.

2 Claims, 4 Drawing Sheets

FIG. 1

RECORDING/READING BEAM

FIG. 2

RECORDING/READING BEAM

RECORDING/REDING BEAM

FIG. 3

RECORDING/READING BEAM

FIG. 4

RECORDING/READING BEAM

FIG. 5

RECORDING/READING BEAM

FIG. 6

RECORDING/READING BEAM

FIG. 7

OPTICAL INFORMATION MEDIUM

BACKGROUND OF THE INVENTION

1. Field of the Invention

This invention relates to an optical disk.

2. Prior Art

There is a growing need for an optical disk having a higher density and a higher capacity. DVD (Digital Versatile Disk) is already commercially available, and the DVD has a storage capacity of about 4.7 GB per single side which is about seven times larger than the compact disk. Technologies enabling further increase in the amount of information recorded are under active development.

Technologies that have been used for increasing the recording capacity of an optical disk include use of a recording/reading beam having a reduced wavelength, use of an objective lens having a higher NA (numerical aperture) in the optical system irradiating the recording/reading beam, increase in the number of recording layers, and multi-value recording. Among these, three-dimensional recording by increasing the number of recording layers enables remarkable increase in the recording capacity at low cost compared to the use of shorter wavelength or use of a lens with a higher NA. The three dimensional recording medium is described, for example, in Japanese Patent Application Kokai (JP-A) 198709/1997, and JP-A 255374/1996 discloses a medium wherein a rewritable information storage layer and a read only information storage layer are laminated.

A multi-layer recording medium having a plurality of recording layer is usually provided with transparent resin layers between the recording layers in order to reduce crosstalk between adjacent recording layers. Attempts have been made to form such resin layer by spin coating. In the case of the multi-layer recording medium, the beam reaches the recording layer after passing through the resin layer, and returns to the optical pickup after being reflected on the surface of the recording layer. As a consequence, severe uniformity is required for the thickness, quality, and optical properties of the resin layer.

The resin layer formed by spin coating, however, suffer from the problem that the disk is thicker at its outer periphery compared to the radially inner region, namely, from the thickness inconsistency in the radial direction of the disk since surface tension only works toward the center of the disk at the outer periphery of the disk and this surface tension results in the excessive resin remaining at the outer periphery of the disk without dropping off the periphery. Increase in the number of the recording layers results in the increase in the number of the resin layers formed, and hence, in the accumulation of the thickness inconsistency. As a result, in the outer peripheral region of some of the recording layers, the reading beam reflected from the surface of the recording layer is not perpendicular to the disk substrate even if the reading beam had entered the medium at an angle perpendicular to the disk substrate. This results in the reduced amount of light returning to the optical pick up, and in some recording layers, the output in the reading will be significantly different between the region near the inner periphery and the region near the outer periphery.

In the case of an optical disk of bonded type wherein the recording layer is sandwiched between two substrates, the disk is prepared by depositing the recording layer and the resin protective layer on one of the substrate in this order, and the other substrate is bonded to the protective layer by using an adhesive or a sheet of pressure sensitive adhesive. When the protective layer is formed in such optical disk of bonded type by spin coating, the increased thickness at the outer periphery of the protective layer is likely to result in warping and distortion of the optical disk, and hence, in the difficulty of improving the mechanical precision of the disk. Although such poor mechanical precision is significant in the multi-layer recording medium, a single layer recording medium having only one recording layer also share the same problem.

The multi-layer recording medium also suffer from the problem as described below. In the case of the medium having a single recording layer formed on a substrate, the shape of the grooves (guide grooves) formed in the resin substrate will be transferred to the recording layer. In contrast, in the case of a medium wherein two or more recording layers are formed on the substrate with an intervening relatively thick transparent layer between the recording layers, it is quite difficult to transfer the shape of the grooves formed in the substrate to all of the recording layers since the groove depth is about 100 nm at most for optical reasons while the distance between the recording layers is far more than such groove depth. As a consequence, formation of the grooves in the transparent resin layer by photo-polymerization (2P) process will be required as described, for example, in the JP-A 198709/1997 and eminent increase in the production cost is invited.

SUMMARY OF THE INVENTION

An object of the present invention is to provide an optical disk which has excellent mechanical precision. Another object of the invention is to provide a multi-layer optical disk having a plurality of data layers wherein every data layer exhibits sufficient properties in reading. Another object of the invention is to provide such multi-layer optical disk at a low cost.

Such objects are attained by the present invention as described in (1) and (2), below. (1) An optical information medium comprising a disk-shaped substrate or a pair of disk-shaped substrates, and at least one annular data layer for storing at least recorded information and at least one annular resin layer disposed on said disk-shaped substrate or between said pair of disk-shaped substrates, wherein
   at least one of said substrate(s) has a configuration such that its surface facing toward the data layer is convex, and at least one of said resin layer(s) is formed such that it is thicker near its outer periphery compared to the region near its inner periphery.

(2) An optical information medium according to the above (1) wherein said medium has a data layer for storing the recorded information and a servo layer for storing servo information which is formed independently from said data layer.

PREFERRED EMBODIMENT OF THE INVENTION

The information medium to which the present invention is applied has a data layer. A "data layer" is the layer wherein record marks and pits carrying the recorded information are present, and a tracking servo pattern comprising projections and depressions such as grooves and pits may also be formed on the data layer. It is also possible to provide a servo layer formed with tracking servo pattern independently from the data layer where no tracking servo pattern is formed. In the present invention, the term "information-storing layer" may be used to refer to both the data layer and the servo layer.

In the present invention, the beam used in the reading of the data layer and the recording of the data layer is designated the "data beam" and the beam used in the reading of the servo layer is designated the "servo beam". The "recording/reading beam" of the present invention is a concept including the data beam and the servo beam.

The "multi-layer information medium" of the present invention is a medium comprising a plurality of information-storing layers, and which includes an information-storing layer whose recording and/or reading is accomplished by the recording/reading beam which has passed through other information-storing layer(s).

The "optical information medium" of the present invention includes both an optical recording medium and a read only medium. In the case of an optical recording medium, the data layer includes a recording layer. In the case of a read only medium, data-storing pits or record marks are preliminarily formed in the data layer.

Figure 1:
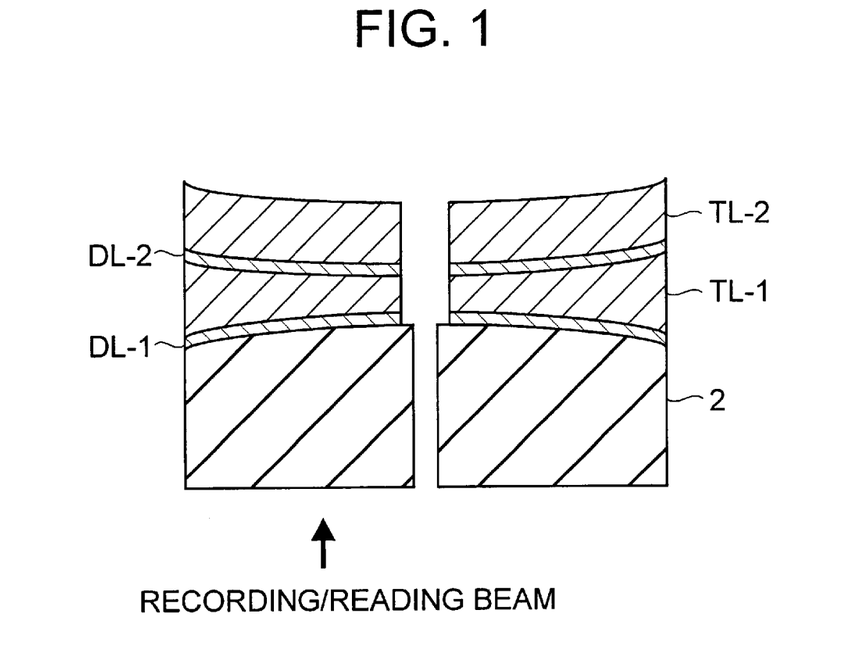
FIG. 1 is a cross-sectional view of the optical information medium according to an embodiment of the present invention.

FIG. 1 shows an embodiment of the multi-layer medium of the present invention. FIG. 1 is a cross-sectional view showing only the end faces appearing at the section, and the views in depth direction is omitted. The medium shown is a multi-layer information medium comprising a substrate 2 having a center hole and two annular data layers DL-1 and DL-2 disposed on the substrate 2. A transparent layer TL-1 is formed between the data layers as a spacer layer, and another transparent layer TL-2 is formed on the data layer DL-2 as a protective layer. The transparent layers TL-1 and TL-2 are both annular resin layers formed by spin coating.

The transparent layer formed by spin coating suffers from the problems as described above since the transparent layer formed is thick in the region near its outer periphery compared to the region near its inner periphery. In view of such situation, the medium of the present invention has a substrate 2 whose surface facing toward the data layer has a convex shape so that the surface height of the substrate 2 near the outer periphery of the data layer DL-1 is lower than the surface height of the substrate 2 near the inner periphery of the data layer DL-2. In the embodiment of FIG. 1, the lower surface of the substrate 2, namely, the surface opposite to the surface formed with the data layer is flat, and a substrate 2 with a thinner outer peripheral region is thereby constituted. The configuration of the lower surface of the substrate 2, however, is not particularly limited, and it may be either a convex or a concave.

In the case of the conventional medium having a substrate 2 which has no intentionally provided thickness inconsistency, the outer peripheral region of the upper data layer DL-2 is tilted upward to a considerable extent because of the thickness inconsistency of the transparent layer TL-1, and as a result, amount of the light returning to the optical pickup from the data layer DL-2 of this region becomes reduced. In contrast, in the case of the medium of FIG. 1 according to the present invention, the thickness inconsistency of the transparent layer TL-1 is partly compensated by the thickness inconsistency of the substrate 2, and the upward tilting of the upper data layer DL-2 in its outer peripheral region is reduced while the corresponding region of the lower data layer DL-1 becomes tilted downward to some extent. As a consequence, decrease in the output in the reading of the outer peripheral region of the data layer DL-2 is suppressed, and the data layer DL-2 and the data layer DL-1 exhibits substantially equivalent properties in the reading.

Figure 2:
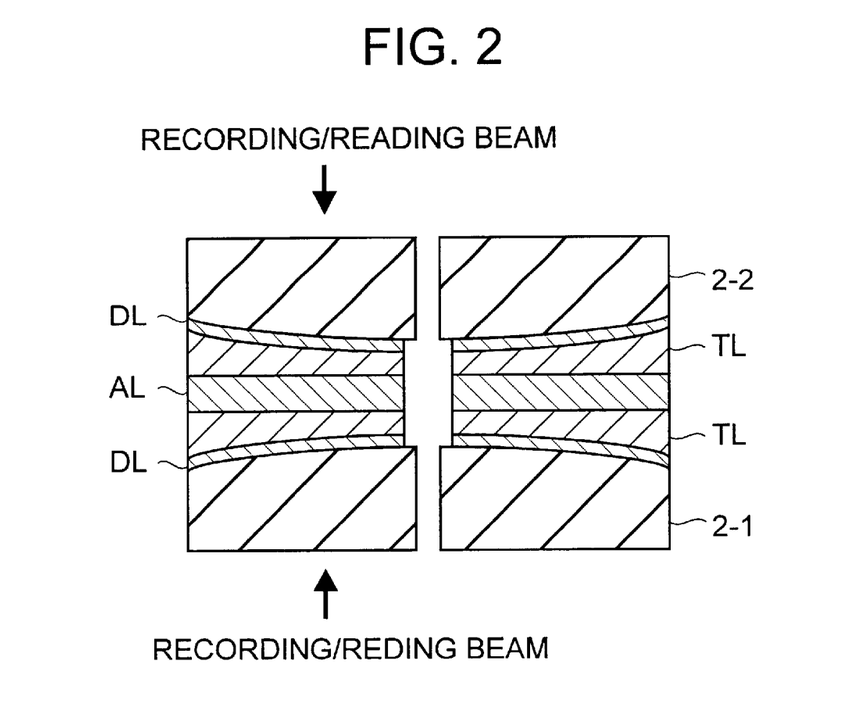
FIG. 2 is a cross-sectional view of the optical information medium according to another embodiment of the present invention.
Figure 3:
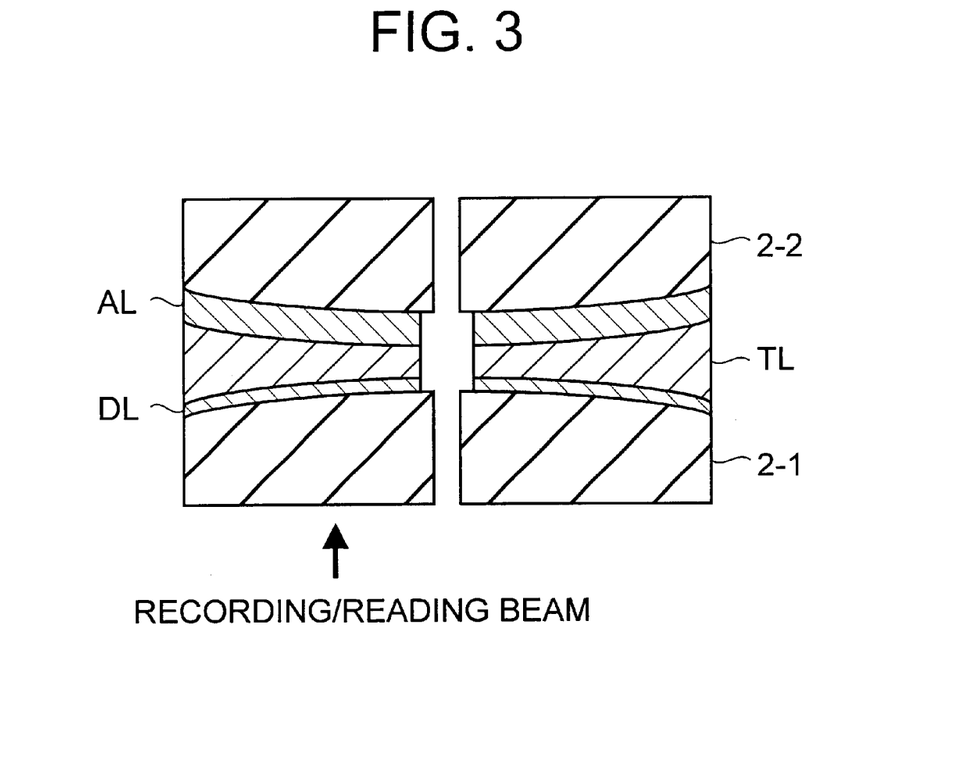
FIG. 3 is a cross-sectional view of the optical information medium according to another embodiment of the present invention.
Figure 4:
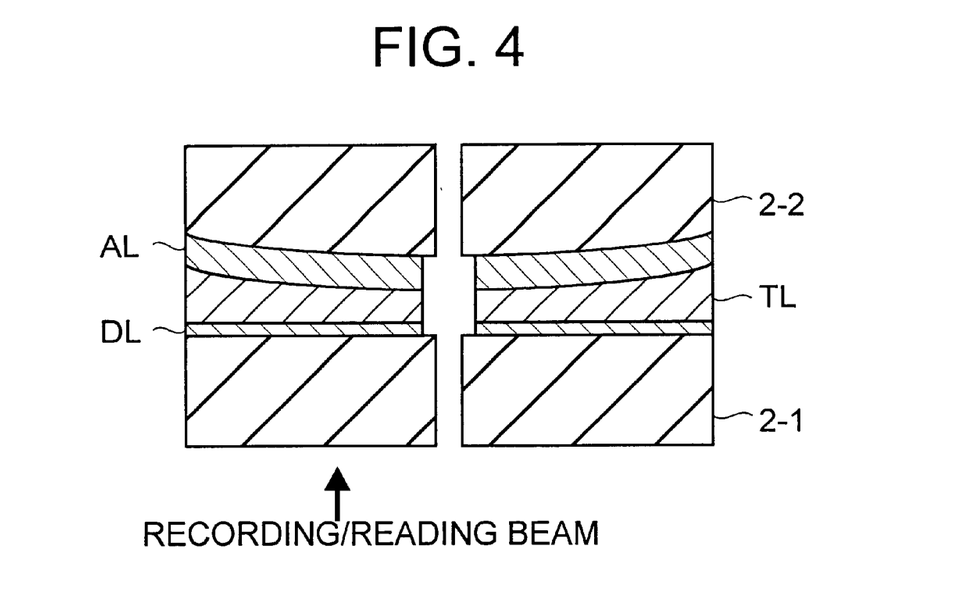
FIG. 4 is a cross-sectional view of the optical information medium according to another embodiment of the present invention.
Figure 5:
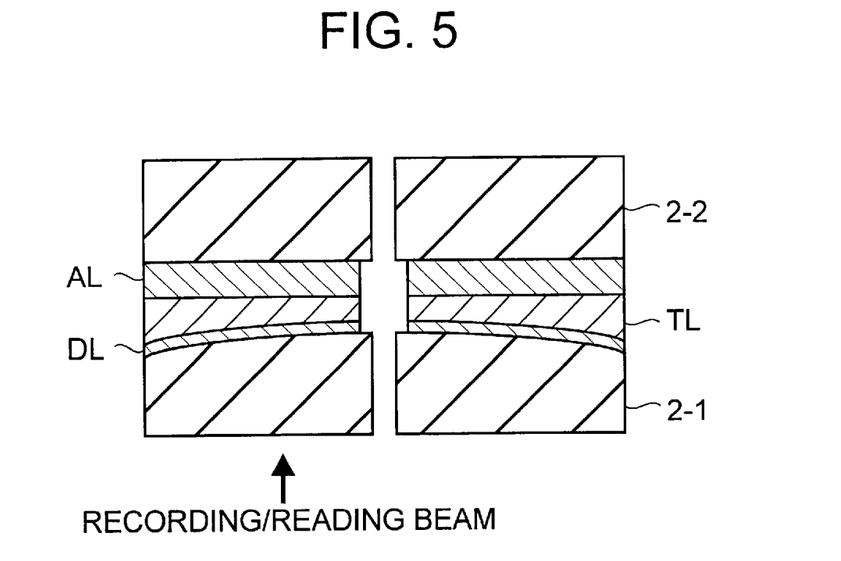
FIG. 5 is a cross-sectional view of the optical information medium according to another embodiment of the present invention.

Another embodiment of the medium according to the present invention is shown in FIG. 2. The medium of this embodiment has been produced by preparing two disk halves each comprising a disk-shaped substrate 2 and a data layer DL and a transparent layer TL formed on the substrate 2, and bonding these two disk halves with an intervening adhesive layer AL with the side of the data layer DL on the inside. Variations of the medium of FIG. 2 are shown in FIGS. 3 to 5, and the mediums shown are of the constitution produced by preparing a disk half comprising a first substrate 2-1 and a data layer DL formed thereon, and bonding this disk half to a second substrate 2-2 with an intervening adhesive layer AL. In the medium shown in FIG. 3, both the first substrate 2-1 and the second substrate 2-2 are of the configuration where the thickness is reduced in the outer peripheral region, and the thickness inconsistency of the transparent layer TL is thereby compensated. In the medium shown in FIG. 4, the surface of the first substrate 2-1 on which the data layer DL is formed is flat while the second substrate 2-2 has the configuration of thinner outer peripheral region, and the thickness inconsistency of the transparent layer TL is compensated by the second substrate 2-2. The medium of FIG. 4 is advantageous in that the data layer DL can be formed to be substantially flat. In the medium shown in FIG. 5, the first substrate 2-1 has the configuration of thinner outer peripheral region while the surface of the second substrate 2-2 facing toward the data layer DL is formed flat, and the thickness inconsistency of the transparent layer TL is compensated by the first substrate 2-1.

In the medium of the embodiments shown in FIGS. 2 to 5, the thickness inconsistency of the transparent layer TL is compensated by the thickness inconsistency of the substrate 2, and the optical disk completed by the adhesion is less likely to be warped and less likely to be distorted by stress. Consequently, the resulting optical disk has good mechanical precision. An optical disk with good mechanical precision exhibits reduced disk facial deflection and reduced acceleration of the facial deflection, and hence, less errors in focusing servo. Stable recording and reading are thereby enabled.

The disk of bonded type as shown in the embodiments of FIGS. 2 to 5 can be also produced by using a multi-layer medium as shown in FIG. 1 for the disk half. In such a case, the resulting optical disk will exhibits reduced output fluctuation in the reading for every data layer, and reduced difference in the reading properties between the data layers. The optical disk will also exhibit good mechanical precision.

In the case of a multi-layer medium, number of the resin layer such as the transparent layer increases with the increase in the number of data layers, and the thickness inconsistency of the increased number of the resin layer is accumulated. Accordingly, the present invention is particularly advantageous in the case of a multi-layer information medium.

The adhesive layer AL of the disk of adhered type as shown in FIGS. 2 to 5 may comprises a film formed by coating and curing a UV-curable adhesive or a pressure sensitive adhesive sheet. A pressure sensitive adhesive sheet is a sheet formed by coating a pressure sensitive adhesive on opposite surfaces of a substrate such as a resin film, and such pressure sensitive adhesive sheet is less likely to become deformed than the resin coated film, and hence, warping and distortion of one disk half is more likely to have influence on the other disk half or the other substrate. In view of such situation, the present invention is particularly advantageous when a pressure sensitive adhesive sheet is used for the adhesive layer.

Various proposals have been made to reduce the increase of the thickness in the resin layer formed by spin coating at the outer periphery of the disk. For example, JP-A320850/1998, JP-A 249264/1998, JP-A 289489/1998, JP-A 195250/1999, and JP-A 195251/1999 disclose methods wherein the center hole of the disk substrate is blocked with a plug means such as a plate-shaped plate, a disk member, a plug member, or a cap, and the resin is supplied to a location near the center of such plug means, namely, near the rotation center. These proposals, however, attempt to control the cross-sectional configuration of the resin layer, and it is quite difficult to drastically reduce the thickness increase at the outer periphery of the resin layer by such methods, and reliable control the configuration is also difficult. In contrast, the thickness increase at the outer periphery of the resin layer is compensated in the present invention by a simple method of controlling the configuration of the substrate which is produced by injection molding. Injection molding is a method wherein shape of the product can be readily controlled at a high reliability, and the present invention has enabled to produce an optical disk wherein the adverse effects of thickness increase at the outer periphery of the resin layer have been substantially compensated both reliably and at low cost.

In the medium of the present invention, difference between the surface elevation of the substrate at the outer periphery of the data layer and the surface elevation of the substrate at the inner periphery of the data layer is not particularly limited. In the resin layer formed by spin coating, the degree and profile of the thickness increase at the outer periphery vary depending on the viscosity of the resin coated, conditions of the spin coating, thickness of the resin layer, and the like. Therefore, the difference in the surface elevation and the profile of the surface of the substrate on the side of the data layer may be determined in each case depending on the degree and profile of the thickness increase at the outer periphery of the transparent layer, and the number of the transparent layer. The difference in the surface elevation is usually in the range of 3 to 300 μm.

In the present invention, the difference in the surface elevation of the substrate $H_d$ and the thickness of the substrate at its inner periphery $D_{in}$ are preferably such that:

$$0.25\% \leq H_d/D_{in} \leq 50\%$$

In the case of a substrate wherein the surface on the side of the data layer is convex and the other surface is flat, the difference in the surface elevation of the substrate $H_d$ can be expressed by the thickness of the substrate at its inner periphery $D_{in}$ and the thickness of the substrate at its outer periphery $D_{out}$ as:

$$H_d = D_{in} - D_{out}$$

It should be noted that the "inner periphery of the substrate" corresponds to the position of the inner periphery of the region where recorded information is retained in the data layer, and the "outer periphery of the substrate" corresponds to the position of the outer periphery of the substrate.

In the present invention, the substrate whose shape is to be controlled is not particularly limited for its thickness. The thickness, however, is usually in the range of 0.1 to 2 mm, and in particular, 0.4 to 1.4 mm. An excessively thin substrate is insufficient in mechanical strength while an excessively thick substrate will invite unduly increased total thickness of the medium when the medium produced is a multi-layer information medium or a disk of bonded type.

Next, the present invention is described in further detail by referring to an embodiment of the multi-layer information medium wherein the present invention is especially advantageous.

Figure 6:
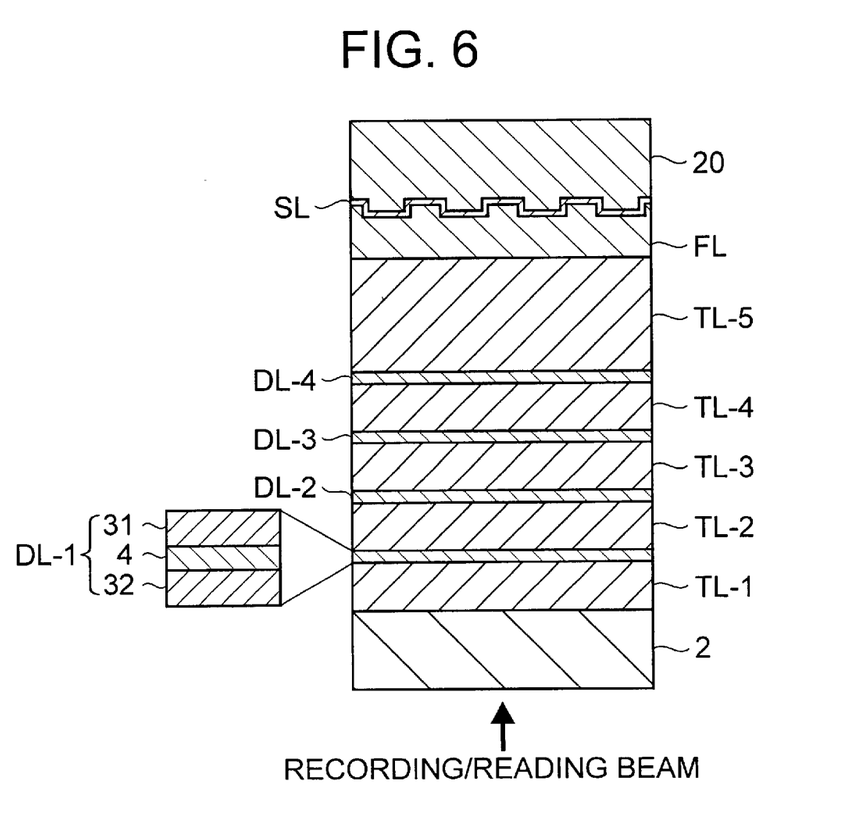
FIG. 6 is a partial cross-sectional view of the optical information medium according to another embodiment of the present invention.

FIG. 6 shows an embodiment of the multi-layer information medium to which the present invention may be applied. The medium of FIG. 6 comprises a substrate 2, five transparent layers TL-1 to TL-5 on the substrate 2, and four data layers DL-1 to DL-4 between the adjacent transparent layers. On the transparent layer TL-5 is formed a filter layer FL, a servo layer SL, and a servo substrate 20 in this order. The servo substrate 20 is formed with a tracking servo pattern comprising grooves and/or pits. A reflective layer is formed on the servo substrate 20 on the side of the recording/reading beam incidence, and this reflective layer functions as the servo layer SL.

In the embodiment of FIG. 6, the data layers are independently formed from the servo layer since formation of a tracking servo pattern at high precision in each data layer is quite difficult when the number of the data layers is two or more, and in particular, three or more. In addition, independent formation of the servo layer SL from the data layers eliminates need of forming the tracking servo pattern in the data layer, and enables formation of a flat data layer. To be more specific, independent formation of the servo layer SL eliminates needs of tracking servo pattern formation by the 2P method as described above in each of the data layers, and production at a reduced cost is thereby enabled. In addition, in the case of a flat data layer, reflectivity of the data layer DL is high, and no interference is induced by the steps of the tracking servo pattern. Noise generation due to irregularities of the tracking servo pattern such as winding or other deformation of the groove is also avoided.

In the recording or reading of the medium of FIG. 6, a servo beam having a wavelength different from the data beam is used in reading the servo layer SL. The medium is irradiated with the data beam and the servo beam from the lower side of the drawing, and the servo beam reaches the servo layer after passing through the data layer.

In the medium of FIG. 6, decrease in the distance between adjacent data layers is preferable since a plurality of data layers are formed in the medium. Decrease in the distance between the data layers, however, is associated with the problem of crosstalk with the beam reflected from other data layers. When the crosstalk is to be reduced in the medium of FIG. 6, use of an optical pickup having a confocal optical system which utilizes the principle of a confocal microscope is desirable. An optical pickup having a confocal optical system has a very high resolution in the thickness direction of the medium, and the cross talk between the data layers can be greatly reduced by the use of such optical pickup. Confocal optical systems which may be used in the reading of a multi-layer information medium are described, for example, in JP-A 222856/1998 and SOM '94 technical digest (1994) 19.

Figure 7:
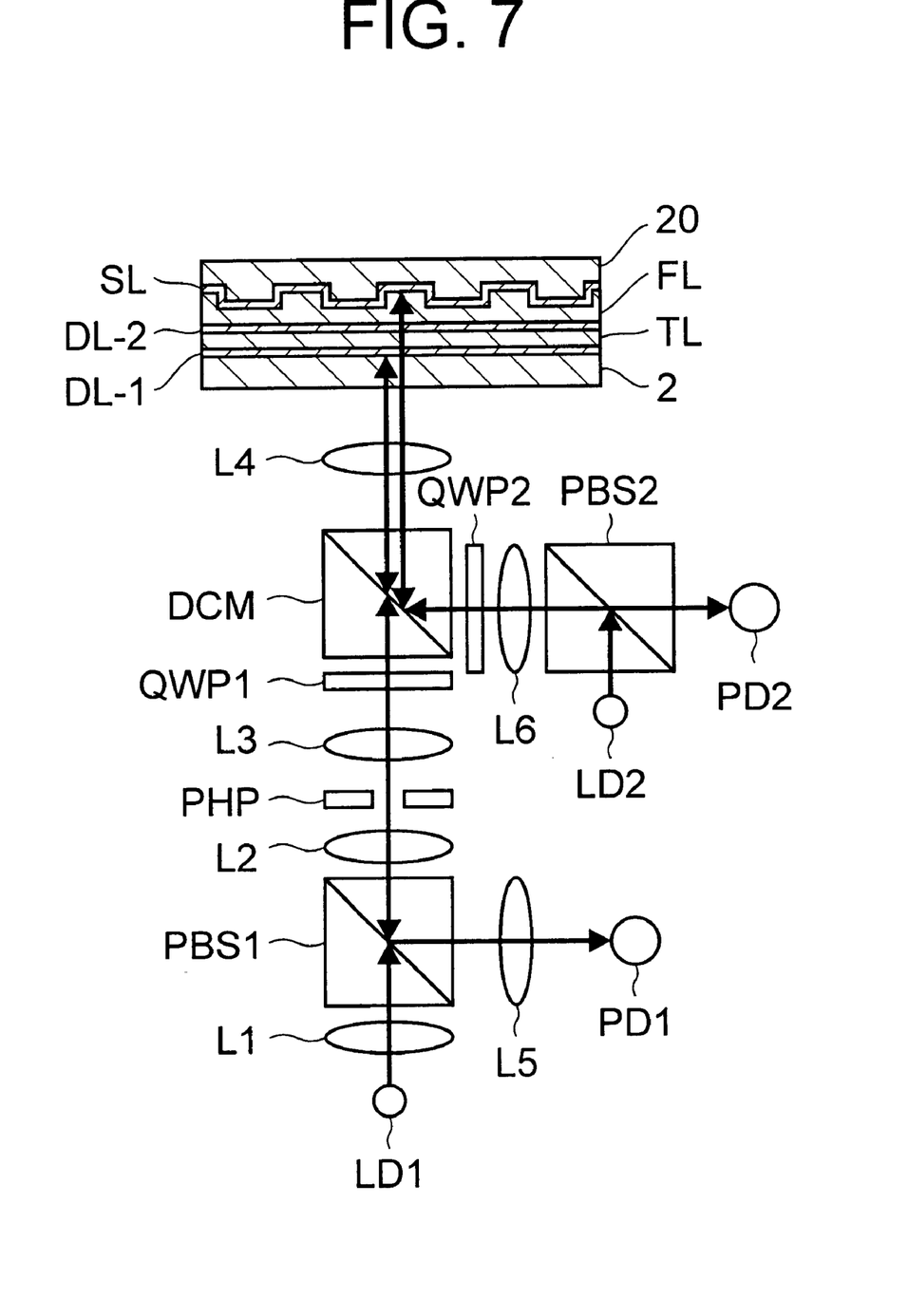
FIG. 7 shows an embodiment of the optical pickup which may be used for recording and reading the optical information medium of the present invention.

An embodiment of the optical pickup which is equipped with a confocal optical system and which can be used in the recording and reading of a multi-layer information medium is shown in FIG. 7 together with the medium. The medium shown in FIG. 7 has a structure comprising a substrate 2, and a data layer DL-1, a transparent layer TL, a data layer DL-2, a filter layer FL, a servo layer SL, and a servo substrate 20 disposed on the substrate 2 in this order.

In this optical pickup, the data beam is emitted from a laser diode LD1. The data beam is then collimated by passing through a lens L1, and after passing through a polarizing beam splitter PBS 1, the beam is focused by a lens L2. A pin-hole plate PHP formed with a pin hole is arranged at the focal point, and the data beam which has passed through the pin hole is collimated by a lens L3, and after passing through a quarter-wave plate QWP 1 and a dichroic mirror DCM transparent to the data beam, the beam enters an objective lens L4 and focused at the data layer DL-1 on the lower side of the multi-layer information medium. The data beam reflected by the data layer DL-1 goes back along the same pathway as the incidence into the medium. The beam is then reflected by the polarizing beam splitter PBS 1 to become focused by a lens L5 to a photodetector PD1, whereby focus servo of the data layer DL-1, or the focus servo and the detection of the signal that had been read is accomplished.

The data beam also reaches the data layer DL-2 after passing through the data layer DL-1 the data of which is to be read, and the beam is also reflected from the data layer DL-2 back to the optical pickup. This data beam, however, is out of focus at the data layer DL-2, and the beam reflected from the data layer DL-2 is not focused to the pinhole position of the pinhole plate PHP. The beam which failed to be unfocused at the pinhole is substantially blocked by the pinhole plate PHP. The cross talk between the data layers is thereby suppressed by the optical pickup equipped with the confocal optical system.

In the meanwhile, the servo beam is emitted from a laser diode LD2. The beam is then reflected by a polarizing beam splitter PBS 2, and goes through a lens L6 and a quarter-wave plate QWP 2 to be reflected by the dichroic mirror DCM. The beam then enters the objective lens L4 to become focused on the servo layer SL. The servo beam is then reflected by the servo layer SL to go back along the same pathway as its incidence into the medium, and the beam passes through the polarizing beam splitter PBS 2 to be focused on a photodetector PD 2. The tracking servo and the focus servo to the servo layer are thereby accomplished.

When the medium is recorded by using such optical pickup, the data layer should be irradiated with a recording beam, namely, with a data beam of high intensity. The tracking servo using the beam reflected from the servo layer is also conducted during the recording, and if a transparent layer is present instead of the filter layer FL, the data beam of high intensity irradiating the data layer passes through the data layer and reaches the servo layer, and a part of the beam reflected at the servo layer reaches dichroic mirror DCM, which has spectral characteristics of reflecting the servo beam while allowing the data beam to pass therethrough. The dichroic mirror DCM, however, is not capable of fully passing the data beam therethrough, and the data beam is partly reflected by the dichroic mirror DCM. A part of the data beam would then reach the photodetector PD 2 provided for the servo purpose to adversely affect the tracking servo. The data beam used for recording has a high intensity, the adverse effect on the tracking servo is serious even if only a part of the beam is reflected by the dichroic mirror DCM. The data beam used for reading with lower intensity may also adversely affect the tracking servo since a part of the beam reaches the photodetector PD 2 provided for the servo purpose.

In view of such situation, it is preferable to provide a filter layer FL having a relatively high absorption for the data beam compared to that for the servo beam between the servo layer SL and the adjacent data layer (DL-4 in the case of FIG. 6, and DL-2 in the case of FIG. 7). When a filter layer FL is provided, the data beam is considerably attenuated on the way and back through the filter layer FL, and the adverse effects on the tracking servo caused by the data beam is greatly suppressed.

Next, constitution of various parts of the optical recording medium of FIG. 6 is described in detail.

Filter Layer

The filter layer is a layer which exhibits an absorption for the data beam higher than that for the servo beam. To be more specific, the absorption of the filter layer for the data beam is preferably 80% or higher and more preferably 90% or higher, and the advantage of the present invention is not fully realized when this absorption is too low. On the other hand, the absorption of the servo beam is preferably 20% or lower and more preferably 10% or lower, and when this absorption is too high, reading of the servo layer by the servo beam which has passed through the filter layer will be difficult, rendering the tracking servo difficult.

The material used for the filter layer is not particularly limited, and an adequate material may be selected from the materials exhibiting the desired spectral absorption characteristics, for example, from the dyes comprising an organic material or an inorganic material. Use of an organic dye is preferable, and use of an organic dye further comprising a resin is more preferable. Exemplary preferable resins include resins curable with UV or other active energy ray. Formation of the filter layer is facilitated by such admixture of the resin component compared to the use of the dye alone. For example, a uniform, relatively thick filter layer can be formed in a short period when a mixture of a UV-curable composition an a dye is spin coated and UV cured.

The dye used for the filter layer is not particularly limited, and an adequate dye may be selected from the dyes exhibiting the spectral absorption characteristics required for a filter layer, for example, from cyanine, phthalocyanine, and azo organic dyes. The dye may be modified as desired, for example, by introducing a substituent in the side chain of the dye in consideration of the compatibility with the resin. The filter layer may also comprise two or more dye layers each having different spectral absorption characteristics for facilitating the control of the spectral absorption characteristics.

When the filter layer contains a dye and a resin, the dye is not limited for its content, and the content may be determined depending on the type of the resin employed and to satisfy the required spectral absorption characteristics. The content is typically 1 to 10 mass %. An excessively low dye content is undesirable since increase in the thickness of the filter layer is required. On the other hand, excessively large content will result in the shortening of the pot life.

When the wavelength of the beam to be absorbed is relatively short, and to be more specific, when steep absorption is to be realized in the wavelength region of up to 450 nm, the filter layer may be constituted from a UV-curable resin layer free from the dye. The UV-curable resin layer may be formed by coating a composition containing a UV-curable composition and a photoinitiator, and UV curing the coated film. The photoinitiator exhibits high absorption near the wavelength of the light beam used for the curing, and the thus cured film also exhibits high absorption near such wavelength. This is believed to be due to the condition that the photoinitiator is not completely decomposed in the course of curing and a part of the photoinitiator remains in intact or modified state after the curing. As a consequence, such layer can be used as a filter layer which exhibits selectively high absorption at the short wavelength region.

The photoinitiator used in the filter layer is not particularly limited, and an adequate photoinitiator may be selected from conventional photoinitiators such as benzoates, benzophenone derivatives, benzoin derivatives, thioxanthone derivatives, acetophenone derivatives, propiophenone derivatives, and benzyls depending on the wavelength of beam to be absorbed.

The thickness of the filter layer may be adequately determined to satisfy the required spectral absorption characteristics. However, the filter layer containing a resin wherein a dye or a photoinitiator is used for the absorption material is preferably formed to a thickness in the range of 1 to 30 $\mu$m. When the filter layer is too thin, sufficient absorption characteristics is less likely to be obtained. When the filter layer is too thick, number of the data layers included in the medium will be limited in view of the total thickness of the medium, and this is not preferable.

When the wavelength of the beam to be absorbed is relatively short, for example, up to 450 nm, a metal layer containing at least one metal (including semimetal) element may be used for the filter layer. Some metals including gold exhibit steep high absorption in the short wavelength region. In view of such situation, the type of the metal included and the thickness of the filter layer may be selected so that sufficient absorption and sufficient transmittance are reliably achieved at the target wavelength regions of absorption and transmittance, respectively. Examples of the metals which may be preferably used in the filter layer include Au, Pt, Cu and the like. The filter layer may also comprise two or more different metal layers each having different spectral absorption characteristics.

The thickness of the metal layer used as the filter layer may vary by the type of the metal used. However, the thickness of such layer is preferably in the range of 10 to 200 nm, and more preferably 20 to 100 nm. When the metal layer is too thin, the layer will fail to exhibit sufficient absorption at the target absorption wavelength region while excessively thick metal layer results in an insufficient transmittance at the target wavelength region.

The filter layer may also comprise an interference filter. Exemplary interference filters which may be used include a dielectric multi-layer film and a dielectric layer sandwiched between two metal thin films comprising Ag or the like.

In the medium of FIG. 6, the reflective layer (the servo layer SL) on the surface of the servo substrate 20 may be used as the filter layer instead of forming a filter layer. In such a case, the servo layer SL may preferably exhibit a relatively high reflectivity for the servo beam and a relatively low reflectivity for the data beam.

The data beam and the servo beam are not particularly limited for their wavelengths. However, difference in the wavelength between these beams is preferably in the range of 50 to 700 nm, and more preferably 100 to 400 nm. When the wavelength difference is too small, the filter layer will be required to have steep spectral absorption characteristics and selection of the material used for the filter layer will be difficult. When the wavelength difference is too large, difficulty is encountered in increasing the recording density of the entire medium or in obtaining sufficient servo accuracy.

The wavelength region wherein the data beam and the servo beam are present is preferably the wavelength region of 300 to 1000 nm, and more preferably 400 to 800 nm. A semiconductor laser oscillating a laser beam having a wavelength shorter than such range is difficult to obtain while use of a laser beam having a wavelength longer than such range is associated with difficulty in high density recording as well as difficulty in the reading of the information recorded at a high density.

Transparent Layer

The transparent layer preferably comprises a material which exhibits high transmittance to the recording/reading beam, and it is preferable to constitute the transparent layer from a resin since the transparent layer should have a substantial thickness. The material used for the transparent layer, however, is not limited to any particular material. The process used for the formation of the transparent layer is not limited. In view of the ease of forming a uniform, transparent layer in short time, the transparent layer is preferably formed by spin coating a resin, and in particular, by spin coating a UV-curable resin or other active energy beam-curable resin. It should be noted that the transparent layer may be also formed from a resin sheet.

The transparent layer formed from a UV-curable resin will exhibit a relatively steep absorption in the short wavelength region due to the influence of the photoinitiator as described above in the section of the "Filter layer". In order to reliably impart the transparent layer with a sufficient transparency to the recording/reading beam in the short wavelength region, an adequate type of photoinitiator should be selected depending on the wavelength of the recording/reading beam used.

When the transparent layer is provided in contact with the substrate 2, it should be noted that the difference between the refractive index of the transparent layer and the refractive index of the substrate is up to 0.1 at the wavelength of the recording/reading beam in order to suppress the reflection at the boundary between the transparent layer and the substrate.

The transparent layer is not particularly limited for its thickness, and the thickness may be adequately determined so that the cross talk between the data layers is within acceptable limits. Typically, the transparent layer has a thickness of at least 30 $\mu$m when an optical pickup of conventional type is used. An excessively thick transparent layer is likely to result in an unduly increased inconsistency in the thickness as well as increased internal stress, and such a thick transparent layer is also likely to invite increase in the total thickness of the medium. Accordingly, the transparent layer preferably has a thickness of up to 100 $\mu$m.

On the other hand, when a confocal optical system is adopted, the thickness of the transparent layer is determined depending on the resolution of the confocal optical system in the depth direction so that the cross talk between the data layers is within acceptable limits. To be more specific, the preferable thickness of the transparent layer is 5 $\mu$or more when the data beam has a wavelength of about 300 to about 1000 nm although such thickness may vary with the wavelength of the data beam and the constitution of the confocal optical system. Use of a confocal optical system enables provision of a transparent layer with a reduced thickness of less than 30 µm, and no problem is induced even when the thickness is reduced to 20 µm or less.

Servo Layer

The servo layer is a reflective layer formed on the servo substrate 20, and the servo layer is formed with the projections and depressions carrying the tracking servo information. The servo layer carries tracking servo information corresponding to the projections and depressions formed. Grooves and/or pits are typically used for such projections and depressions.

The reflective layer constituting the servo layer is not particularly limited for its constitution, and the reflective layer formed may be similar to those formed in conventional optical information media. The reflective layer may typically comprise a metal or semimetal such as Al, Au, Ag, Pt, Cu, Ni, Cr, Ti, or Si as a simple substance or as an alloy containing at least one of such metals and semimetals. The reflective layer is typically formed to a thickness of 10 to 300 nm. A thickness below such range is likely to result in an insufficient reflectivity while the thickness in excess of such range is not advantageous in cost since increase in the thickness does not result in significant increase of the reflectivity. The reflective layer is preferably formed by vapor deposition such as sputtering and evaporation.

Data Layer

When the present invention is applied to an optical recording medium, the data layer includes at least a recording layer comprising a recording material. The optical recording medium to which the present invention is applied is not limited particular type, and applicable media include a rewritable medium or a write once medium employing a phase change recording material, a rewritable medium employing a magnetooptical recording material, and a write once medium employing an organic dye. However, use of a phase change recording material is preferable in view of high light transmittance compared to other recording materials, and accordingly, capability of increasing the number of recording layers.

The composition of the phase change recording material is not particularly limited, and the material is preferably the one containing at least Sb and Te. However, crystallization temperature of the recording layer containing Sb and Te as the only components is as low as about 130° C. and the storage reliability is insufficient, and therefore, the recording layer may preferably comprise elements other than Sb and Te. Such element is preferably element M (element M is at least one element selected from In, Ag, Au, Bi, Se, Al, P, Ge, H, Si, C, V, W, Ta, Zn, Ti, Ce, Tb, Sn, Pb, Pd, and Y), and among these, the preferred is Ge in view of the high effect in improving the storage reliability.

When the atomic ratio of the elements constituting the recording layer is represented by the formula (I):

$$Sb_aTe_bM_c \qquad (I),$$

wherein a+b+c=1, a, b, and c are preferably such that:

$0.2 \leq a \leq 0.85$, $0.1 \leq b \leq 0.6$, and $0 \leq c \leq 0.25$, and more preferably, $0.01 \leq c \leq 0.25$.

When the content of Sb is too low, crystallization speed will be insufficient and the overwriting will be difficult. On the other hand, when the Sb content is too high, crystallization speed will be excessively high and formation of amorphous record marks will be difficult. When the content of M is too low, the effect of M addition will be insufficient while addition of M in an excessive amount will result in insufficient alteration of the reflectivity with the phase change, and hence, in an insufficient degree of modulation. When Te content is too low, formation of record marks will be difficult due to the difficulty in amorphization. On the other hand, when the Te content is too high, crystallization speed will be insufficient and overwriting will be difficult.

A phase change recording medium is generally used as a rewritable medium. In the present invention, however, the phase change recording medium may be used as a write once medium. The "write once medium" used herein designates a medium which is recordable but wherein erasure of the once recorded record mark is not ensured, and in the case of a write once medium, overwriting of the record marks recorded in the recording track by erasing the record marks is not intended. Advantages associated with the use of a phase change recording medium for the write once medium are as described below.

In the case of a multi-layer recording medium, a plurality of recording layers are disposed one on another, and this structure is accompanied with an increased loss in the light quantity of the recording/reading beam. Therefore, use of a thinnest possible recording layer is desired. Decrease in the thickness of the recording layer, however, invites an increase in the cooling speed of the recording layer after the recording beam irradiation. Crystallization is less likely to take place at a higher cooling speed, and use of a composition which easily undergo crystallization is required to ensure the erasability. In other words, considerable increase in the crystallization speed of the recording layer will be required. A recording layer of high crystallization speed, however, is associated with the problem of higher occurrence of the self erase as described below. In the recording, heat dissipates from the beam spot of the recording beam in the lateral direction of the recording layer, and cooling of the record marks is inhibited by this heat. When the recording layer has a high crystallization speed, the record marks are partly recrystallized due to such cooling inhibition, and the size of the record mark formed will be reduced. To be more specific, the phenomenon often encountered is erasure of the leading edge of the record mark (the part first irradiated with the beam spot) or the trailing edge of the record mark. Such phenomenon is referred in the present invention as the "self erase". The self erase is associated with decrease in the C/N or increase in the jitter.

As described above, when the thickness of the recording layer is reduced, it will be difficult to simultaneously ensure sufficient erasability and suppress the self erase. In contrast, when a medium having a phase change recording layer is used as a write once medium, there will be no need to erase the record marks, and hence, to consider the crystallization speed of the recording layer. Accordingly, no problem will be induced even if the crystallization speed of the recording layer were reduced to the level where no substantial influence on the self erase is induced. In addition, when the medium is overwritten, increase in the crystallization speed of the recording layer is required with the increase in the linear velocity of the medium in the recording, and this also invites increased likeliness of self erase. However, if the medium is recorded only once with no overwriting operation, it will be possible to conduct the recording at a high linear velocity, for example, at a linear velocity of about 10 m/s in a recording layer having a relatively slow crystallization speed with reduced likeliness of self erase, and a high data transfer rate is easily realized.

When a plurality of recording layers are disposed one on another, loss of the light quantity of the recording/reading beam is accordingly increased. Therefore, use of a thinnest possible recording layer is preferable with the function of the recording layer maintained. However, an excessively thin recording layer can no longer function as a recording layer, and the recording layer preferably has a thickness of 2 to 50 nm, and more preferably, 4 to 20 nm.

When a phase change recording layer is employed, the data layer may preferably have the structure as shown for DL-1 in FIG. 3. This data layer has a structure wherein the recording layer 4 is sandwiched between the first dielectric layer 31 and the second dielectric layer 32. When such structure is adopted, the recording layer and the dielectric layers are preferably formed by sputtering. The dielectric material used in the dielectric layers may be a compound containing at least one metal component selected from Si, Ge, Zn, Al, and rare earth metals, and the compound is preferably an oxide, a nitride, a sulfide, or a fluoride. A mixture containing two or more such compounds may be also used. Each dielectric layer may preferably have a thickness of 10 to 500 nm.

In the multi-layer information medium, use of a recording layer having a reduced thickness is preferable in order to reduce the loss in the light quantity of the recording/reading beam. Decrease in the thickness of the phase change recording layer, however, is associated with a decrease in the degree of modulation, namely, with a decrease in the difference in reflectivity between the amorphous record mark and the crystalline region. In order to increase the degree of modulation, the dielectric layer is preferably formed as a laminate of two or more layers each having different refractive index. Such multi-layer structure also results in an increased flexibility of optical design, and increase in the light transmittance of the entire data layer can be realized. An exemplary dielectric layer of multi-layer structure is a laminate of at least one layer selected from magnesium fluoride layer, manganese fluoride layer, germanium nitride oxide layer, and silicon oxide layer with a ZnS—$SiO_2$ layer.

When a plurality of recording layers are formed, intensity of the recording beam reaching the particular recording layer reduces with the increase in the distance of the recording layer from the surface of the recording beam incidence into the medium. Therefore, recording sensitivity of the recording layer is preferably adjusted corresponding to the intensity of the recording beam reaching to the particular recording layer. In the case of recording materials wherein the medium is recorded by heat mode recording as in the case of phase change recording materials, increase in the thickness of the recording layer results in an increase in heat capacity, and hence, in an increase in the recording sensitivity. In view of such situation, the thickness of the recording layer remote from the surface of the recording beam incidence may be increased as required compared to the recording layer near the surface of the recording beam incidence. However, adjacent two recording layers may have an identical thickness. In addition, the recording/reading beam used in the recording layer remote from the surface of the recording beam incidence is the recording/reading beam which has passed through other recording layers, and for the purpose of leveling the reading properties of the recording layers, a recording layer near the surface of the recording beam incidence may preferably have a higher light transmittance. In consideration of such light transmittance, ok it is also preferable that the recording layer remote from the surface of the recording beam incidence has an increased thickness.

It should be noted that the adjustment of the recording sensitivity and the transmittance can also be accomplished through control of the composition of the recording layer. In such case, all recording layers may be formed to an identical thickness, or alternatively, control of the composition can be combined with the control of the thickness.

The structure shown in FIG. 6 is also applicable to a read only medium. The data layers of such medium may comprise either a layer formed with pits carrying the recorded information or a layer of a write once medium carrying the preliminarily recorded data. In the former case, the pits are generally formed in the transparent layer or the filter layer, and a translucent reflective layer is formed on the pitted surface of the layer by sputtering or the like. The reflective layer will then serve as the data layer. Examples of such translucent reflective layers are an extremely thin metal layer and a silicon layer. In such read only medium, reflectivity of the data layer may be controlled for the leveling of the read-out signal. To be more specific, the reflectivity may be controlled such that the data layer with the smaller quantity of light reached exhibits higher reflectivity. When the reflectivity is controlled as described above, the data layer near the surface of the beam incidence will exhibit higher light transmittance and marked attenuation in the quantity of the light reaching the data layer remote from the surface of the beam incidence will be avoided.

In the multi-layer information medium to which the present invention is applied, number of the data layers included in the medium is not limited as long as two or more data layers are included. An excessive number of data layers, however, results in unduly increased thickness of the medium and the effect of the thickness inconsistency of the transparent layer formed by spin coating will also surpass the acceptable level. Accordingly, the number of the data layers is preferably up to 10, and more preferably up to 6.

When a plurality of information-storing layers are disposed one on another, quantity of the light reflected from the information-storing layer will be reduced. However, it has been found in the investigation of the inventors of the present invention that sufficient C/N at the data layer and sufficient servo signal at the servo layer are attained when the maximum reflectivity of the information-storing layer is 5% or less. However, sufficient C/N and servo signal intensity will not be ensured when the reflectivity is excessively low, and the information-storing layer may preferably have a maximum reflectivity of at least 0.1%.

Substrate 2 and Servo Substrate 20

The substrate 2 preferably comprises a material which is substantially transparent to the recording/reading beam such as a resin or glass since the recording/reading beam is irradiated through the substrate 2. Among such materials, use of a resin is preferable in view of the handling convenience and the low price, and exemplary resins include acrylic resins, polycarbonates, epoxy resins, and polyolefins. However, when the recording/reading beam used has a wavelength as short as about 450 nm or below, a polycarbonate substrate will exhibit an excessively high absorption of the recording/reading beam, and use of a material such as an amorphous polyolefin exhibiting lower optical absorption to a short wavelength beam is preferable.

The substrate 2 is not limited for its shape and dimension. The substrate 2, however, is typically a disk having a thickness of at least 5 μm and preferably about 30 μm to 3 mm and a diameter of about 50 to 360 mm.

The servo substrate 20 shown in FIG. 6 may comprise a resin or a glass as in the case of the substrate 2. Use of a resin, however, is preferable in view of the ease of forming the servo information-carrying projections and depressions by injection molding. It should be noted that the servo substrate 20 is not necessary transparent. The servo substrate 20 is also not limited for its thickness, and an adequate thickness may be selected, for example, from the range described for the substrate 2. However, when the substrate 2 has a relatively low rigidity, the rigidity of the entire medium is preferably ensured by increasing the thickness of the servo substrate 20 to a considerable degree.

The present invention has been described in the foregoing by referring to a multi-layer information medium which has a filter layer and which is adapted for use in a system using a plurality of recording/reading beam having different wavelengths. The main advantages of the present invention, however, are realized when a resin layer is formed by spin coating, and the present invention is also effective for the medium having no filter layer.

EXAMPLES

Example 1

Samples of the optical recording disks having the structures shown in FIGS. 3 to 5 were produced by the procedure as described below.

Substrate A having a reduced thickness near its outer periphery and substrate B having a uniform thickness was prepared for use as the substrate 2. Both substrates were polycarbonate disks having a diameter of 120 mm, and the disks had grooves formed at the time of its production by injection molding.

The substrate A or B was used for the first substrate 2-1, and a data layer DL comprising a first dielectric layer, a recording layer, a second dielectric layer, and a reflective layer was formed on the surface of the substrate 2-1. The dielectric layers formed had a composition of ZnS—SiO$_2$, the recording layer was formed from a chalcogenide compound containing antimony as its main component, and the reflective layer was formed from an aluminum alloy. A transparent layer TL of 5 $\mu$m thick was then formed on the data layer DL by spin coating a UV-curable resin and UV-curing the coating. A disk half was thereby completed. To the transparent layer TL of this disk half was then adhered a second substrate 2-2 which was either the substrate A or B by an intervening sheet of pressure sensitive adhesive to obtain Sample Nos. 1 to 3 corresponding to FIGS. 3 to 5. A Sample for comparison purpose prepared by using the substrate B for both the first substrate 2-1 and the second substrate 2-2 was also produced.

The samples were evaluated for their mechanical properties by irradiating the samples with a laser beam having a wavelength of 680 nm from the side opposite to the surface formed with the data layer. The items evaluated were facial deflection in the radial direction of the disk, its acceleration, and alteration of camber angle. It was then confirmed that, compared to Sample No. 4 prepared by using a substrate of uniform thickness, Sample Nos. 1 to 3 prepared by using a substrate with thinner outer peripheral region showed less camber angle in the outer peripheral region as well as significantly suppressed increase in the facial deflection and its acceleration.

Example 2

An optical recording disk sample having the structure shown in FIG. 6 was produced by the procedure as described below.

Substrate A1 was produced as in the case of the substrate A of Example 1 except that no grooves were formed, and this substrate A1 was used for the substrate 2. On one surface of the substrate 2 were alternately formed four transparent layers TL-1 to TL-4 and four data layers DL-1 to DL-4.

The transparent layers were formed by spin coating a UV-curable resin (SK-5110 manufactured by Sony Chemicals Corporation) at a rotation speed of 1500 rpm for 2 seconds and UV curing the coated resin. The transparent layer after the curing had a thickness of 15 $\mu$m. It should be noted that this thickness is a value measured at the radially intermediate position of the area where recorded information is carried (the area at a radial distance of 20 mm to 58 mm from the center of the disk).

The recording layer 4 included in each data layer had a composition (atomic ratio) of: $Sb_{22}Te_{56.0}Ge_{21.9}$ The recording layers 4 were formed to a thickness of 5 nm, 5 nm, 7 nm, and 13 nm, respectively, from the side of the data beam incidence. The recording layer 4 was formed by magnetron sputtering system and the thickness was adjusted by controlling the power, pressure, and time of the sputtering.

The thickness of the first dielectric layer 31 and the second dielectric layer 32 included in each data layer was adjusted to the range of 75 to 271 nm to thereby ensure absorption of the recording layer and simultaneously increase the light transmittance of the entire data layer. These dielectric layers were formed by magnetron sputtering system and the composition of the layers was ZnS (80 mole %)-SiO$_2$ (20 mole %).

In the meanwhile, a gold layer was deposited as a servo layer SL to a thickness of 50 nm by sputtering on the grooved surface of the servo substrate 20 comprising the substrate A produced in Example 1. On the surface of this servo layer SL was formed a filter layer FL, and the filter layer FL was formed by spin coating a mixture (dye content, 3 mass %) of a phthalocyanine dye (Blue-N manufactured by Nippon Kayaku Co., Ltd.) and a UV-curable resin at a rotation speed of 2500 rpm for 5 seconds and UV curing the layer. The filter layer FL after curing had a thickness of 11 $\mu$m. The filter layer FL exhibited an absorption of 95% at a wavelength of 660 nm, and 8% at a wavelength of 780 nm. It should be noted that the absorption is a value evaluated by forming the filter layer alone on a transparent plate, and measuring the absorption for this filter layer.

Next, UV-curable resin (DVD-003 manufactured by Nippon Kayaku Co., Ltd.) was dripped on the top surface of the laminate including the substrate 2 (on the surface of the uppermost data layer DL-4), and the laminate including the servo substrate 20 was aligned on the laminate including the substrate 2. The laminates were rotated at 5000 rpm for 2 seconds, and the UV-curable resin was cured by UV irradiation through the substrate 2 to thereby adhere the laminate including the substrate 2 and the laminate including the servo substrate 20 by an intervening transparent layer TL-5 of 35 $\mu$m thick. A sample of the optical recording disk having the structure shown in FIG. 6 was thereby produced. This sample is designated sample A.

Next, substrate B1 was produced as in the case of the substrate B of Example 1 except that no grooves were formed. The substrate B of Example 1 was also produced. An optical recording disk having a structure shown in FIG. 6 was produced as in the case of the sample A except that the substrate Bi was used for the substrate 2 and the substrate B was used for the servo substrate 20. This sample is designated sample B.

The thus produced samples A and B were evaluated for their reflectivity profile in radial direction by irradiating the sample from the side of the substrate 2 with a laser beam having a wavelength of 680 nm and detecting the beam returned with the beam focused at each data layer. It was then confirmed that decrease in the reflectivity of the data layer in its outer peripheral region is suppressed in the case of sample A prepared by using a substrate having a thinner outer peripheral region compared to the case of sample B prepared by using a substrate having a uniform thickness.

Merits of the Invention

In the optical disk of the present invention, increased thickness of the spin coated resin layer near its outer periphery is compensated by controlling the configuration of the substrate, and therefore, the optical disk exhibits good mechanical properties as well as sufficiently reduced fluctuation in the output and excellent stability in the reading.

Japanese Patent Application No. 233785/2000 is incorporated herein by reference.

Although some preferred embodiments have been described, many modifications and variations may be made thereto in the light of the above teachings. It is therefore to be understood that, within the scope of the appended claims, the invention may be practiced otherwise than as specifically described.

What is claimed is:

1. An optical information medium comprising a disk-shaped substrate or a pair of disk-shaped substrates, and at least one annular data layer for storing at least recorded information and at least one annular resin layer disposed on said disk-shaped substrate or between said pair of disk-shaped substrates, wherein at least one of said substrate(s) has a configuration such that its surface facing toward the data layer is convex, and at least one of said resin layer(s) is formed such that it is thicker near its outer periphery compared to the region near its inner periphery.

2. An optical information medium according to claim 1 wherein said medium has a data layer for storing the recorded information and a servo layer for storing servo information which is formed independently from said data layer.

* * * * *

UNITED STATES PATENT AND TRADEMARK OFFICE
CERTIFICATE OF CORRECTION

PATENT NO. : 6,603,733 B2
DATED : August 5, 2003
INVENTOR(S) : Tsukagoshi et al.

It is certified that error appears in the above-identified patent and that said Letters Patent is hereby corrected as shown below:

Title Page,
Item [75], Inventors, information is incorrect. Should read:
-- Takuya Tsukagoshi, Tokyo (JP);
Jiro Yoshinari, Tokyo (JP) --

Signed and Sealed this

Eighth Day of June, 2004

JON W. DUDAS
*Acting Director of the United States Patent and Trademark Office*